Patented Oct. 25, 1932

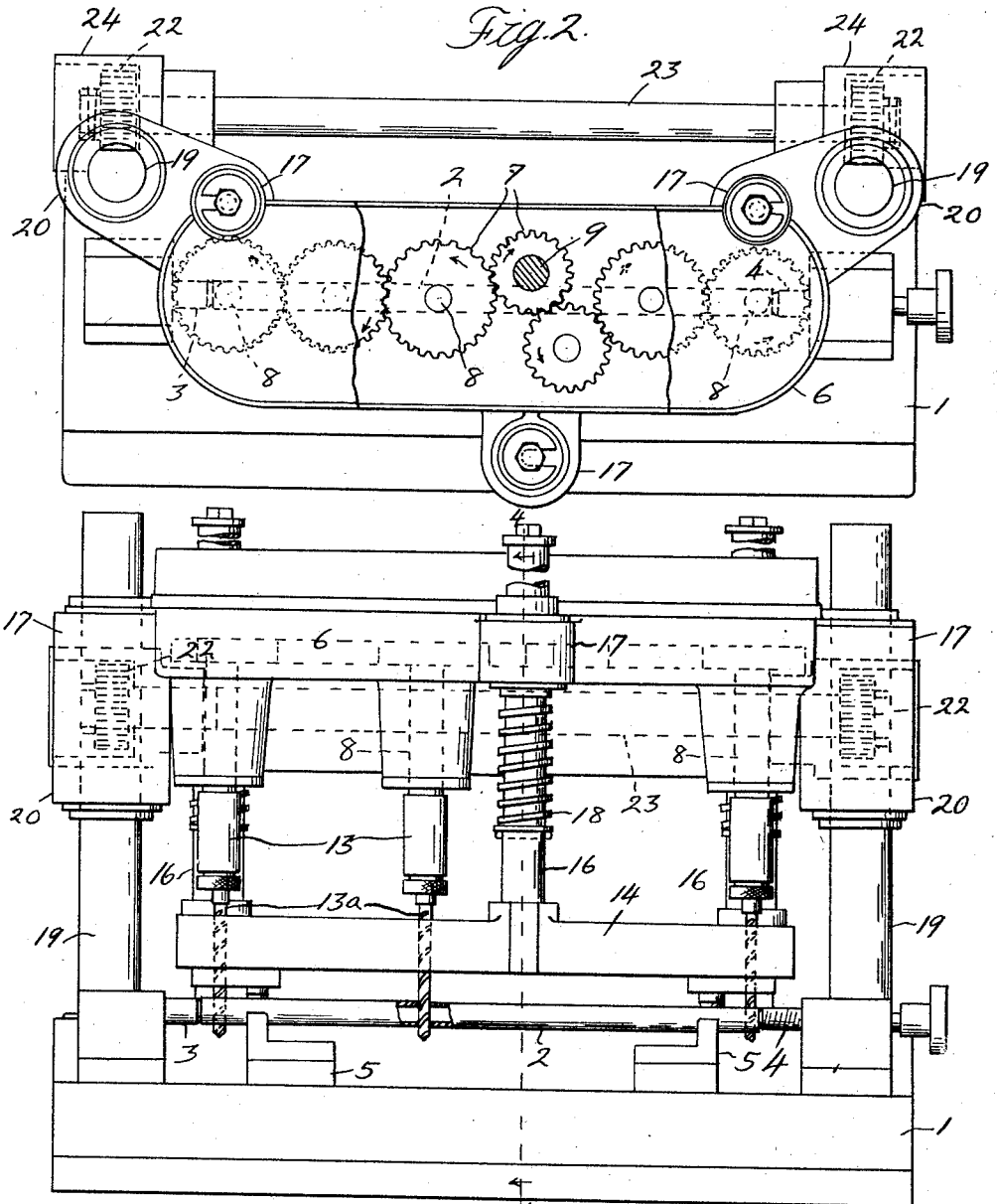

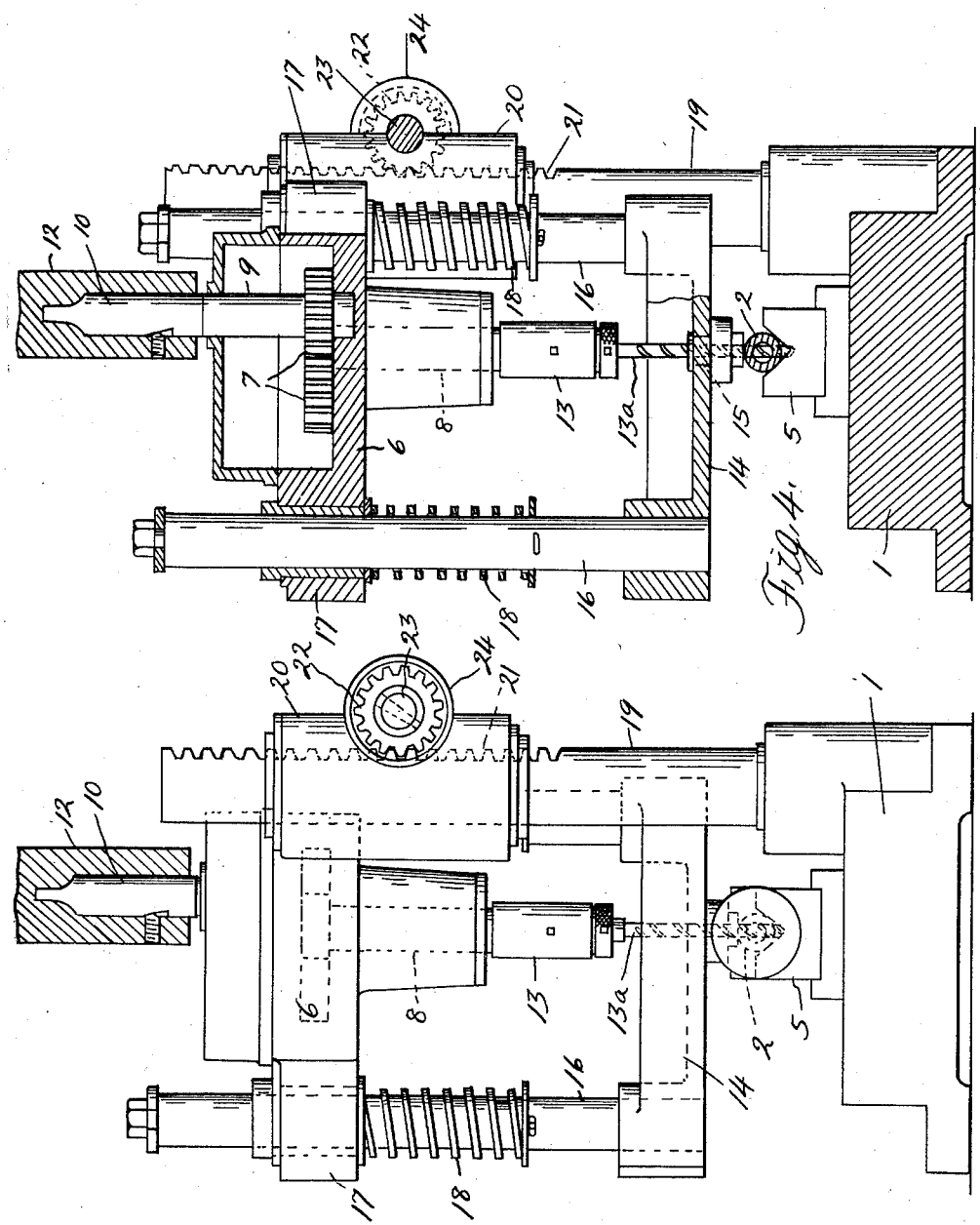

1,884,752

UNITED STATES PATENT OFFICE

HENRY R. KRUEGER, OF DETROIT, MICHIGAN, ASSIGNOR, BY MESNE ASSIGNMENTS, TO EX-CELL-O AIRCRAFT AND TOOL CORPORATION, OF DETROIT, MICHIGAN, A CORPORATION OF MICHIGAN

MULTIPLE DRILL HEAD

Application filed August 5, 1929. Serial No. 383,573.

This invention relates to reciprocatory tool heads, and particularly to multiple drill heads.

A multiple drill head usually has an axis of support coincident with its main driving axis, and when the drive spindles of the individual drills are journaled in said head at no considerable distance from the main drive spindle, it is not usually essential to accurately adjust the several drills for concurrent engagement with the work, since the up thrust imposed upon the head by any drill engaging the work ahead of the others lacks sufficient leverage to create objectionable stresses.

It is required quite commonly, however, that some of the drills of a multiple drill head be considerably spaced from the supporting axis of the head and it has heretofore been necessary in the use of such a head to quite accurately provide for concurrent engagement of the drills with the work, since any outer drill engaging the work in advance of the others would react upon the head under a leverage powerfully tending to tilt the head and cause breakage or bending of parts or inaccurate drilling.

It is an object of the present invention to subject a multiple drill head in its approach to the work to a very positive restraint against tilting, and to thereby avoid necessity for accurately adjusting the drills of such a head for concurrent engagement with the work.

Another object is to provide such connections between parts of a drill head oppositely remote from the supporting axis of said head and corresponding parts of a work holder as to permit free reciprocation of the head relative to the holder, while positively preventing tilting of the head about its point of support.

A further object is to journal upon a multiple drill head a shaft carrying a pair of pinions oppositely remote from the axis of support of said head, and to engage said pinions with racks projecting from a work holder coacting with said head, whereby any thrusts reacting from the work upon either end of the head are equalized at both ends of the head through said pinions and shaft.

These and various other objects the invention attains by the construction hereinafter described and illustrated in the accompanying drawings, wherein:

Fig. 1 is a front view of a multiple drilling apparatus embodying the present improvements, and showing the drills engaging a piece of work.

Fig. 2 is a top plan view of said apparatus.

Fig. 3 is an end view of the same.

Fig. 4 is a cross sectional view, taken upon the line 4—4 of Fig. 1.

In these views, the reference character 1 designates a work holder which may have any construction suited to the work to be held. As illustrated, said work holder mounts a shaft 2 engaging the same terminally by a pair of clamping abutments 3 and 4, the latter of which is threaded in the holder for an axial adjustment. Said shaft is further engaged at suitable points by upstanding supporting projections 5 on the holder.

Reciprocatory above said work holder is a multiple drill head 6 encasing a train of gears 7 through which a plurality of vertically journaled spindles 8 are adapted to be driven from a main spindle 9, vertically journaled substantially centrally of the head. The latter spindle has a tapered shank 10 projecting above the casing 6 to engage in the usual reciprocatory socket member 12 of a drill press (not shown). The member 12 is a support for the entire head 6, as well as a driving element for the drills thereof.

Below the head 6 the spindles 8 carry suitable sockets 13, receiving drills 13a. While the illustrated embodiment of the invention shows three such drills, it will be understood that any number thereof may be employed.

Between the work holder 1 and head 6 is disposed a plate 14 carrying bushings 15 for guiding the drills into accurate engagement with the work. Said plate is suitably carried by the head 6, as by rigidly mounting it upon a plurality of upstanding guide rods 16 slidable in suitable bearings 17 of the head and downwardly urged by springs 18 coiled on said rods below said bearings.

Rigidly carried by the work holder at its ends is a pair of upstanding posts 19 upon which are slidable sleeves 20 integrally formed upon the head 6 at its ends. Said rods are formed upon their rear faces with racks of teeth 21, with which are meshed a pair of pinions 22 fast on the ends of a shaft 23 horizontally journaled in bearings 24 formed as integral rearward projections from said sleeves.

In the use of the described drill head, the plate 14 engages the work upon downward actuation of the head 6, slightly in advance of the drill points and places the springs 17 under compression to hold said bushing plate firmly in proper guiding position as the drills enter the work. Said plate also opposes the upward drag applied to the work by the drills, as the latter are being withdrawn.

In case any of the drills (and more particularly the outermost drills) engages the work in advance of the others, such drill reacts upon the corresponding end of the head 6 to subject such end to an up-thrust. No appreciable yielding of the head under such thrust is, however, permitted, since the pinions 22 are equally subjected to a driving torque by such thrust, owing to engagement of said pinions with the racks 21, and the latter in equally restraining rotation of said pinions prevent tilting of the head.

Thus, the drill head is maintained accurately horizontal despite upward stresses arising from nonconcurrent engagement of its drills with the work, and necessity of accurately adjusting the drills for concurrent engagement with the work is avoided.

The described guide means has an application to any multiple drill head or other reciprocatory member in which it is necessary to counteract tilting stresses resulting from nonconcurrent engagement with the work of tools carried by said head or member remotely from its supporting axis.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claim.

What I claim is:

In a multiple drilling apparatus, a work holder, a pair of spaced parallel posts rigidly carried by said work holder, a drill head between said posts, means mounting said drill head upon said posts for reciprocation to and from said work holder, a plurality of drill carriers journaled in said head parallel to said posts, a shaft freely rotative in said head transversely to said posts, a rack carried by each of said posts, a pair of pinions terminally rigidly carried by said shaft and meshing with said racks, a drill guide plate disposed between said work holder and head, a plurality of guide rods mounting said guide plate on said head independently of said posts, and means journaled in said head for driving said drill carriers and for feeding the drill head under pressure toward the work holder, independently of said pinion-mounting shaft, whereby said freely rotative shaft and pinions thereon function to maintain uniform movement of both ends of the head toward the work.

In testimony whereof I sign this specification.

HENRY R. KRUEGER.